(12) United States Patent
Runyon

(10) Patent No.: US 7,178,794 B2
(45) Date of Patent: Feb. 20, 2007

(54) FLUID ISOLATOR ASSEMBLY AND FLOATING ELASTOMERIC DAMPING ELEMENT

(75) Inventor: John Frederick Runyon, St. Paul, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 163 days.

(21) Appl. No.: 10/659,616

(22) Filed: Sep. 10, 2003

(65) Prior Publication Data

US 2004/0119213 A1 Jun. 24, 2004

Related U.S. Application Data

(60) Provisional application No. 60/409,438, filed on Sep. 10, 2002.

(51) Int. Cl.
*F16F 9/04* (2006.01)
(52) U.S. Cl. .................. 267/64.27; 267/64.28
(58) Field of Classification Search ............ 267/64.27, 267/64.28
See application file for complete search history.

(56) References Cited

U.S. PATENT DOCUMENTS

| | | | | |
|---|---|---|---|---|
| 2,773,686 A * | 12/1956 | Nash | ........................ | 267/64.23 |
| 3,321,200 A * | 5/1967 | Polhemus et al. | ........ | 267/64.27 |
| 3,627,246 A | 12/1971 | Widding et al. | ......... | 248/188.8 |
| 3,730,473 A | 5/1973 | Pepi | ........................ | 248/358 R |
| 3,826,507 A * | 7/1974 | Brand et al. | ................. | 267/3 |
| 3,961,371 A | 6/1976 | Kobylarz et al. | ........... | 360/101 |
| 4,029,305 A * | 6/1977 | Schubert et al. | ......... | 267/64.23 |
| 4,052,212 A | 10/1977 | Deguchi et al. | ............. | 96/56.2 |
| 4,126,303 A * | 11/1978 | Yanagisawa et al. | ......... | 267/34 |
| 4,160,390 A | 7/1979 | Spaetgens | ..................... | 74/574 |
| 4,235,427 A * | 11/1980 | Bialobrzeski | ............... | 267/153 |
| 4,332,397 A * | 6/1982 | Steger | .................. | 280/124.155 |
| 4,345,285 A | 8/1982 | DeMoss et al. | ............. | 360/133 |
| 4,360,184 A | 11/1982 | Reid, III | ..................... | 248/573 |
| 4,555,096 A * | 11/1985 | Pryor | ....................... | 267/64.21 |
| 4,621,796 A | 11/1986 | Fresch et al. | ............. | 267/64.28 |
| 4,647,025 A * | 3/1987 | Gold | ........................ | 267/64.27 |
| 4,662,615 A * | 5/1987 | Paton | ....................... | 267/64.24 |
| 4,688,774 A * | 8/1987 | Warmuth, II | ............. | 267/64.21 |
| 4,690,388 A * | 9/1987 | Harrison | ....................... | 267/35 |
| 4,697,797 A * | 10/1987 | Gold | ........................ | 267/64.24 |
| 4,703,470 A | 10/1987 | Castagna et al. | ........... | 369/215 |
| 4,715,107 A | 12/1987 | Fresch et al. | .................. | 29/436 |
| 4,733,847 A | 3/1988 | GrassL | ....................... | 248/550 |
| 4,750,405 A | 6/1988 | DeMey, II | .................... | 91/171 |
| 4,905,956 A | 3/1990 | Zemlicka et al. | ........... | 248/562 |
| 4,937,806 A | 6/1990 | Babson et al. | ............. | 369/75.1 |
| 4,974,819 A | 12/1990 | Reichard et al. | .......... | 267/140.1 |
| 5,004,215 A | 4/1991 | Aubry et al. | ............. | 267/140.1 |
| 5,066,708 A | 11/1991 | Koller, Sr. et al. | ......... | 524/504 |
| 5,124,855 A | 6/1992 | Dew et al. | ................ | 360/97.02 |
| 5,335,893 A | 8/1994 | Opp | ............................ | 248/635 |
| 5,349,486 A | 9/1994 | Sugimoto et al. | ......... | 360/97.01 |
| 5,374,039 A | 12/1994 | Schmidt et al. | ......... | 267/140.13 |

(Continued)

*Primary Examiner*—Robert A. Siconolfi
(74) *Attorney, Agent, or Firm*—Fellers, Snider, et al.

(57) ABSTRACT

An isolator apparatus is described to attenuate or isolate vibration. The isolator apparatus includes a fluid isolator assembly including a flexible diaphragm and a pressure chamber having a flow passage opened to the pressure chamber to provide a fluid spring. A floating isolator body including an elastomeric damping element is floatably interfaced with the flexible diaphragm of the fluid isolator assembly to isolate vibration.

9 Claims, 6 Drawing Sheets

U.S. PATENT DOCUMENTS

| | | | |
|---|---|---|---|
| 5,413,320 A | 5/1995 | Herbst | 267/140.13 |
| 5,501,434 A | 3/1996 | McGuire | 267/140.11 |
| 5,508,856 A | 4/1996 | Fujimoto | 360/63 |
| 5,549,269 A * | 8/1996 | Gertel et al. | 267/35 |
| 5,673,158 A | 9/1997 | Ichimura | 360/97.01 |
| 5,682,291 A | 10/1997 | Jeffries et al. | 361/1.85 |
| 5,703,734 A | 12/1997 | Berberich et al. | 360/97.02 |
| 5,708,633 A | 1/1998 | Hollen et al. | 369/44.11 |
| 5,730,429 A | 3/1998 | Ivers et al. | 267/140.14 |
| 5,751,551 A | 5/1998 | Hileman et al. | 361/753 |
| 5,777,845 A | 7/1998 | Krum et al. | 361/685 |
| 5,931,441 A | 8/1999 | Sakamoto | 248/550 |
| 5,957,440 A | 9/1999 | Jones et al. | 267/140.14 |
| 5,996,960 A | 12/1999 | Krajec | 248/638 |
| 6,002,588 A | 12/1999 | Vos et al. | 361/708 |
| 6,036,162 A | 3/2000 | Hayashi | 248/550 |
| 6,042,079 A | 3/2000 | Hogenkamp | 248/550 |
| 6,045,328 A | 4/2000 | Jones | 416/140 |
| 6,056,381 A | 5/2000 | Turner | 312/351 |
| 6,064,567 A | 5/2000 | Cheng | 361/685 |
| 6,070,850 A | 6/2000 | Lehman | 248/622 |
| 6,082,489 A | 7/2000 | Iwao et al. | 181/286 |
| 6,092,795 A | 7/2000 | McGuire | 267/140.11 |
| 6,122,232 A | 9/2000 | Schell et al. | 369/44.11 |
| 6,123,312 A | 9/2000 | Dai | 248/550 |
| 6,123,325 A * | 9/2000 | Buchanan et al. | 267/122 |
| 6,257,561 B1 * | 7/2001 | Nakayama et al. | 267/64.19 |
| 6,547,224 B2 * | 4/2003 | Jensen et al. | 267/64.17 |
| 2001/0017341 A1 | 8/2001 | Gennesseaux | |
| 2003/0034600 A1 * | 2/2003 | Wolf | 267/218 |

* cited by examiner

FLUID ISOLATOR ASSEMBLY AND FLOATING ELASTOMERIC DAMPING ELEMENT

CROSS-REFERENCE TO RELATED APPLICATION

This application claims priority from U.S. Provisional Application Ser. No. 60/409,438 filed on Sept. 10, 2002 for inventor John F. Runyon and entitled LOW COST, LOW PROFILE, PNEUMATIC/VISCOELASTIC ISOLATOR.

FIELD OF THE INVENTION

The present invention relates generally to an isolator apparatus, and more particularly but not by limitation to an isolator apparatus including a fluid isolator assembly or fluid spring and viscoelastomeric damping.

BACKGROUND OF THE INVENTION

Vibration or shock can interfere with operation of mechanical or electro-mechanical systems. Isolator or damping assemblies are interposed in a load or vibration path to damp or control vibration of such systems. Different vibration frequencies can be more problematic than other vibration frequencies affecting operation of such systems. For example, different vibration frequencies can interfere with alignment of servo patterns or information recorded by a servo writing apparatus. Prior damping or isolator assemblies having a higher natural frequency provide less low frequency isolation to accommodate an underdamped or overdamped system in a small space. Embodiments of the present invention provide solutions to these and other problems and offer other advantages over the prior art.

SUMMARY OF THE INVENTION

The present invention relates to an isolator apparatus to attenuate or isolate vibration. The isolator apparatus includes a fluid isolator assembly or fluid spring including a flexible diaphragm which retains fluid in a chamber. A floating body including an elastomeric damping element is floatably interfaced with the flexible diaphragm to isolate vibration. Other features and benefits that characterize embodiments of the present invention will be apparent upon reading the following detailed description and review of the associated drawings.

BRIEF DESCRIPTION OF THE DRAWINGS

FIG. 3 is a cross-sectional view taken along line 3—3 of FIG. 2 with the diaphragm in an expanded profile.

DETAILED DESCRIPTION OF ILLUSTRATIVE EMBODIMENTS

Figure 1:
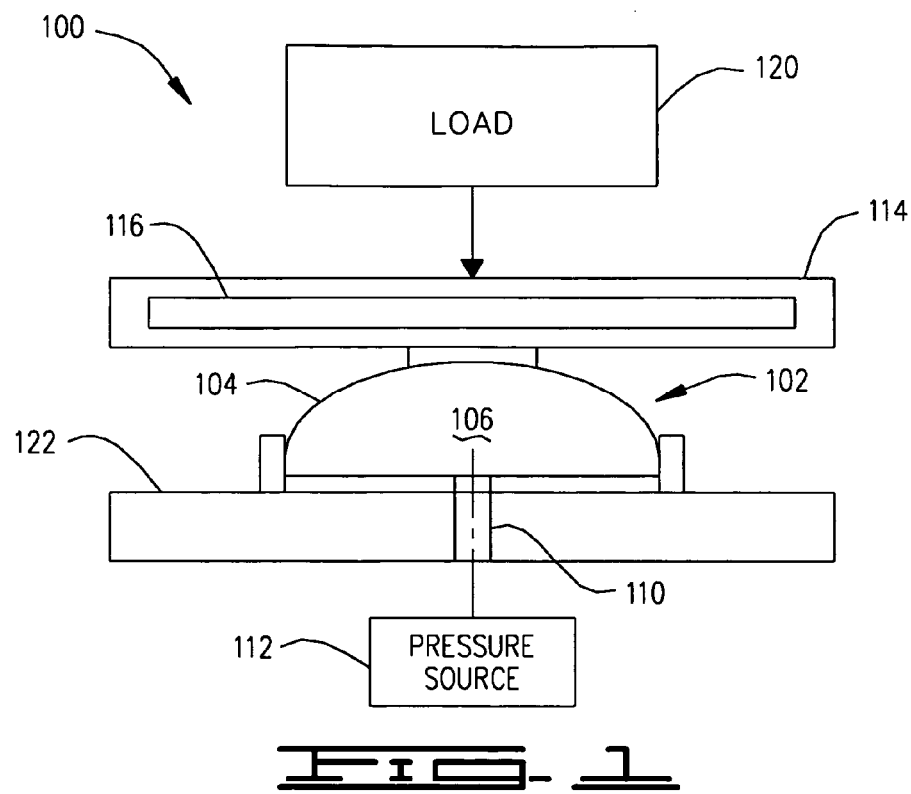
FIG. 1 is a schematic illustration of an embodiment of an isolator or device of the present invention.

FIG. 1 is a schematic illustration of an isolator apparatus or device 100. As shown, device 100 includes a fluid isolator assembly or fluid spring 102 and elastomeric (viscoelastic) damping to damp or attenuate vibration. The fluid isolator assembly 102 includes a flexible diaphragm 104 and a pressure or fluid chamber 106. Fluid flows into and out of the fluid chamber 106 through passageway 110 to provide a fluid spring to damp vibration. Fluid chamber 106 is pressurized or filled with fluid from pressure source 112 to expand the diaphragm 104 from a collapsed profile (not shown in FIG. 1) to an expanded profile for use. The isolator assembly 100 includes a floating isolator body 114 floatably supported by or interfaced with the diaphragm 104 so that vibration or motion is attenuated by the fluid isolator assembly 102 (when chamber 106 is pressurized) in series with the floating body 114.

The floating body 114 as shown includes a viscoelastic damping element 116 to provide viscoelastomeric damping separate from the fluid isolator assembly 102. The floating body 114 and fluid isolator assembly 102 provide an interface between a load 120 and a base or frame 122 and in the illustrated embodiment provide a load path from the floating body 114 through the diaphragm 104 to the fluid isolator assembly or transmission path between the floating body and the fluid isolator assembly through the flexible diaphragm 104. The floating body 114 is coupled in series with the fluid isolator assembly. In the illustrated embodiment vibration impacted to or transmitted to the fluid isolator assembly 102 is imparted through the diaphragm 104 to the floating body 114 to damp or attenuate vibration.

The fluid chamber 106 can be a pneumatic or gas chamber or can be pressurized using other medium. For example, the chamber can be filled with helium or other fluid to reduce the natural frequency $\omega_n$ of the assembly without increasing system volume. The diaphragm 104 is formed of a relatively thin flexible structure, such as a reinforced fabric (for example a fabric reinforced rubber) or other material. The passageway and chamber are sized to control damping profiles or the spring constant and natural frequency $\omega_n$ of the fluid isolator assembly. In an embodiment described, the fluid isolator assembly 102 includes an expanded mode and a collapsed mode.

In the expanded mode the chamber is pressurized to fill the chamber to a working volume. In an expanded profile of the filled chamber, the diaphragm 104 is taut to support the load and allow transmission of low frequency vibration through the fluid isolator assembly 102 and pressure chamber 106. In the embodiment described, the system or apparatus can be designed to provide only a low natural frequency for the fluid damping system or spring which provides similar sprint rates in both horizontal and vertical directions and provides a higher frequency viscoelastic damping for vibration bypassing chamber 106 by traveling on the taut surface of the diaphragm.

Figure 2:
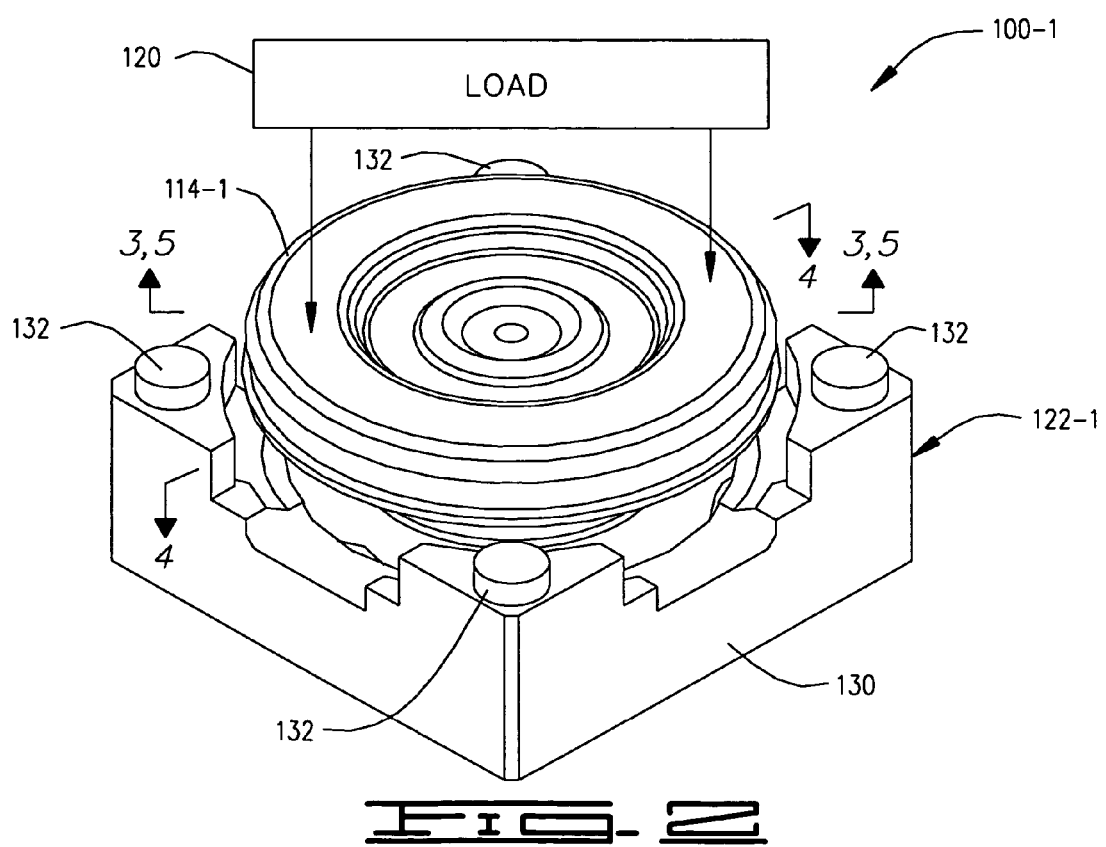
FIG. 2 is an embodiment of an isolator apparatus and cradle.
Figure 2:
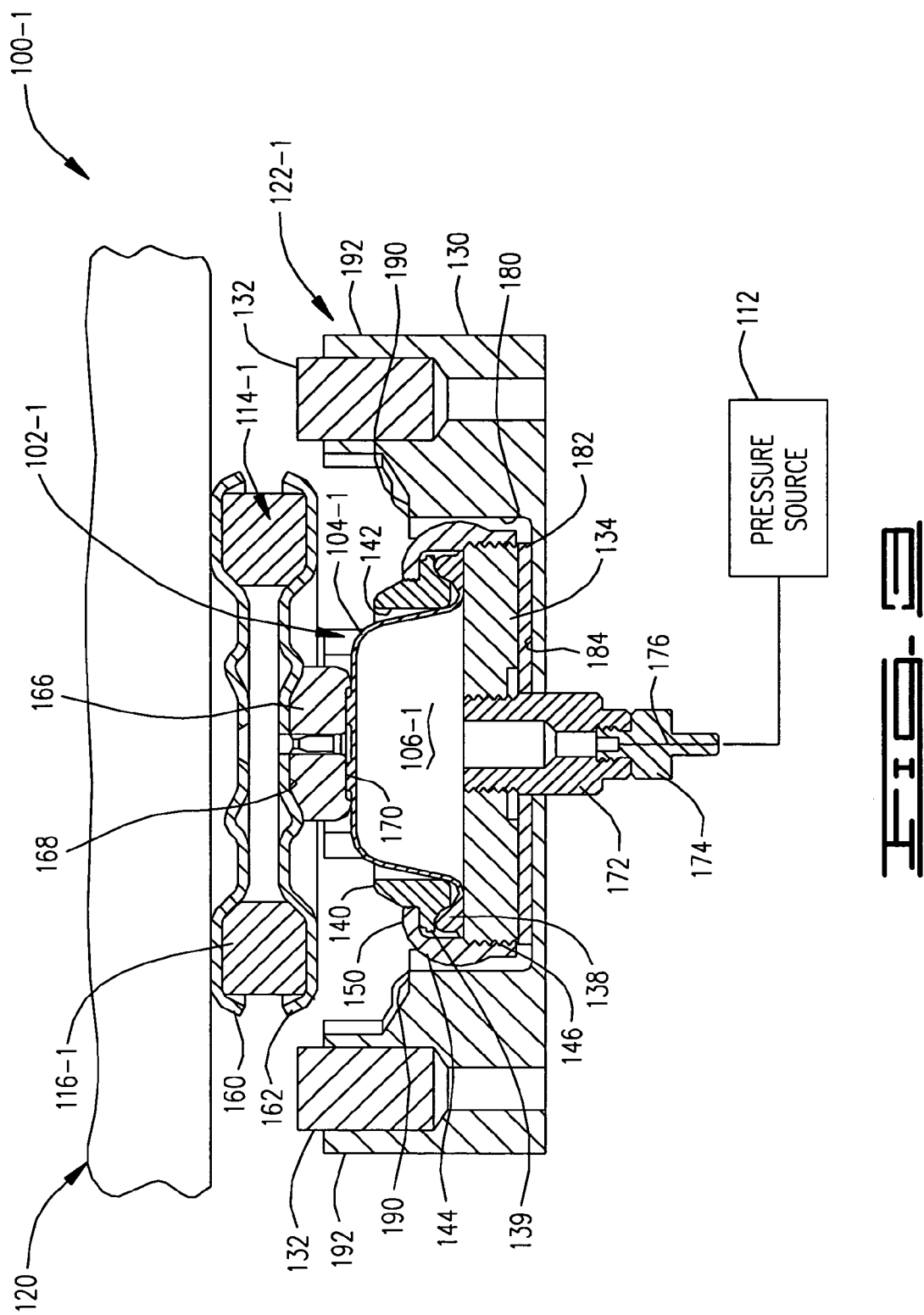
Figure 4:
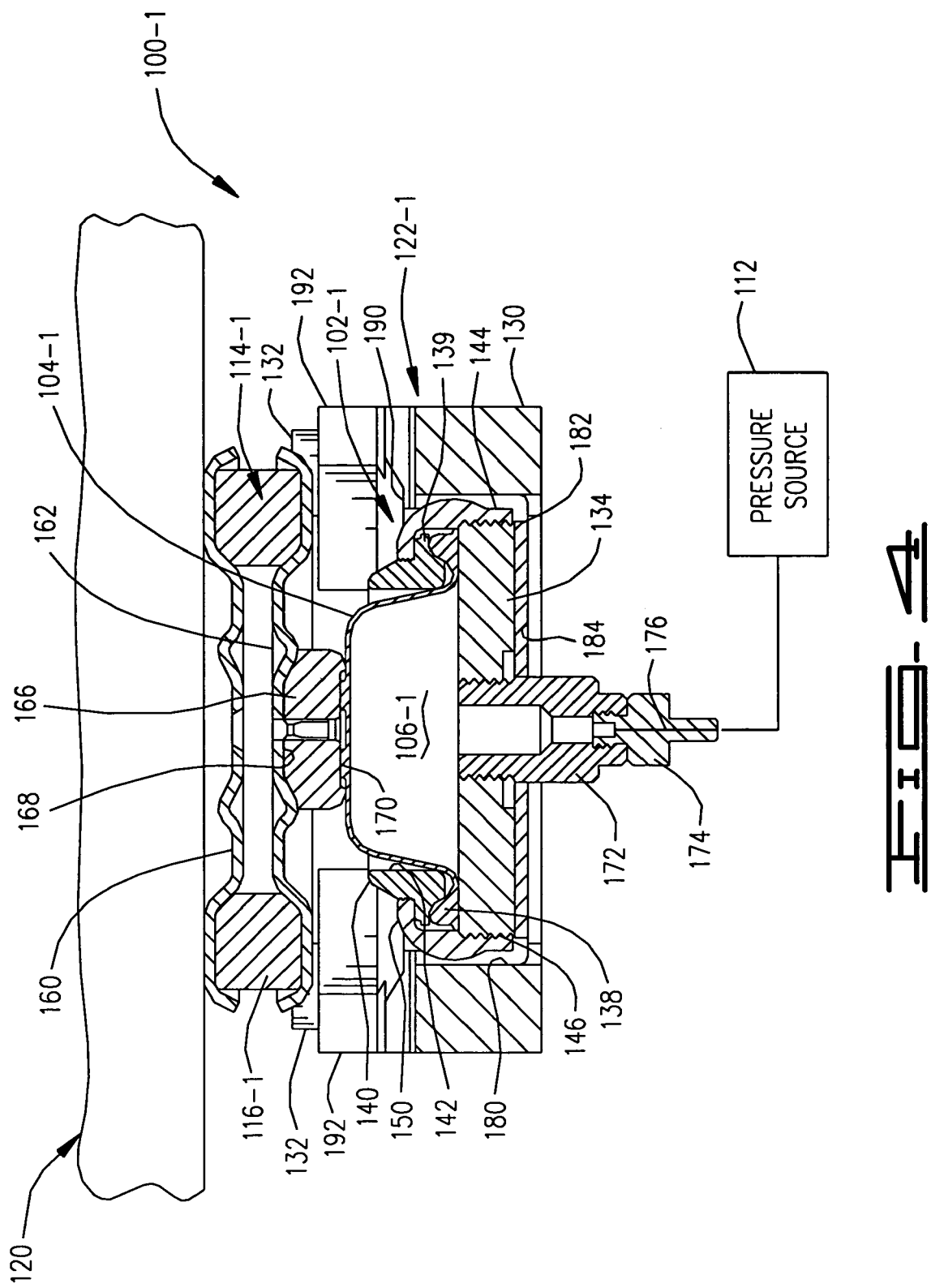
FIG. 4 is a cross-sectional view taken along line 4—4 of FIG. 2.

FIGS. 2–5 illustrate an embodiment of an isolator apparatus 100-1 including a fluid isolator assembly and viscoelastic damping as previously described where like numbers are used to refer to like parts in the previous FIGS. As shown in FIG. 2, load 120 is supported on or coupled to the floating body 114-1 to isolate vibration relative to base 122-1 through the isolator assembly. In the embodiment shown, base 122-1 includes a cradle 130 that includes a plurality of plugs 132 which form a resilient load interface to support the load 120 separate from the isolator assembly during non-operational periods, such as during shipping or transport. In particular, plugs 132 provide a load surface or interface to transfer the load 120 gently to the cradle 130 when the fluid isolator assembly is collapsed or in the collapsed mode to prevent compression set of the viscoelastic damping element and diaphragm or diaphragm seal. In an illustrated embodiment, plugs 132 are formed of urethane and form a portion of cradle 130. When cradle 130 is not included, floating body 114-1 provides elastomeric damping even when fluid isolator assembly 102 is not pressurized.

As shown in FIG. 3, diaphragm 104-1 is expanded via pressurization of chamber 106-1 so that the load 120 is supported or interfaced through the floating body 114-1 to the fluid isolator assembly 102-1. In the illustrated embodiment, the fluid isolator assembly 102-1 includes a rigid base plate 134 to form the chamber 106-1. In the embodiment shown, the diaphragm 104-1 includes a ridge portion 138 thereabout. The ridge portion 138 of the diaphragm 104-1 is clamped or secured between the rigid base plate 134 and a rim portion 139 of ring 140 which forms a cylindrical cavity 142. The base plate 134 and ring 140 are secured or clamped by a clamp or fastener 144. Fastener 144 includes an internally threaded portion 146 and an inner rim 150 (or ferrule). Threaded portion 146 of fastener 144 is secured to a threaded portion of the base plate 134 so that inner rim 150 abuts the rim portion 139 of the ring 140 to bias the rim 139 of ring 140 against the ridge portion 138 of diaphragm 140-1. Threaded portion 146 clamps or secure the ring 140 relative to the base plate and compresses the perimeter ridge portion 138 of the diaphragm 104-1 between the rim portion 139 of ring 140 and the base plate 134 to provide an air seal thereabout.

In the embodiment shown the floating body 114-1 includes a toroid shaped viscoelastic element 116-1 disposed between opposed body plates 160, 162. In particular, the toroid shaped viscoelastic element can be punched or stamped from viscoelastic pad stock, such as Sorbothane available from the Sorbothane Corp. of Ohio. Load 120 is supported by the body plates 160, 162 or interfaced with the floating body 114-1 separate from and in series with the fluid isolator assembly 102-1. Load is transferred to the fluid isolator assembly through a load button 166. Load button 166 is formed of a plastic or rubber material and the load plates are formed of a metal or plastic material. Load button 166 can be secured to or formed integrally with the diaphragm 104-1 or alternatively can be secured to the floating body or both the diaphragm 104-1 and the floating body. In one embodiment, body plates 160, 162 of the floating body 114-1 include a conical seat 168 and the diaphragm 104-1 includes a rubber washer 170. In one illustrated embodiment, the rubber washer 170 is molded to the diaphragm 104-1 although application is not limited to the particular embodiment shown. The load button 166 is centered in the conical seat 168 and washer to provide a load interface between the floating body 114-1 and the diaphragm as shown.

Figure 5:
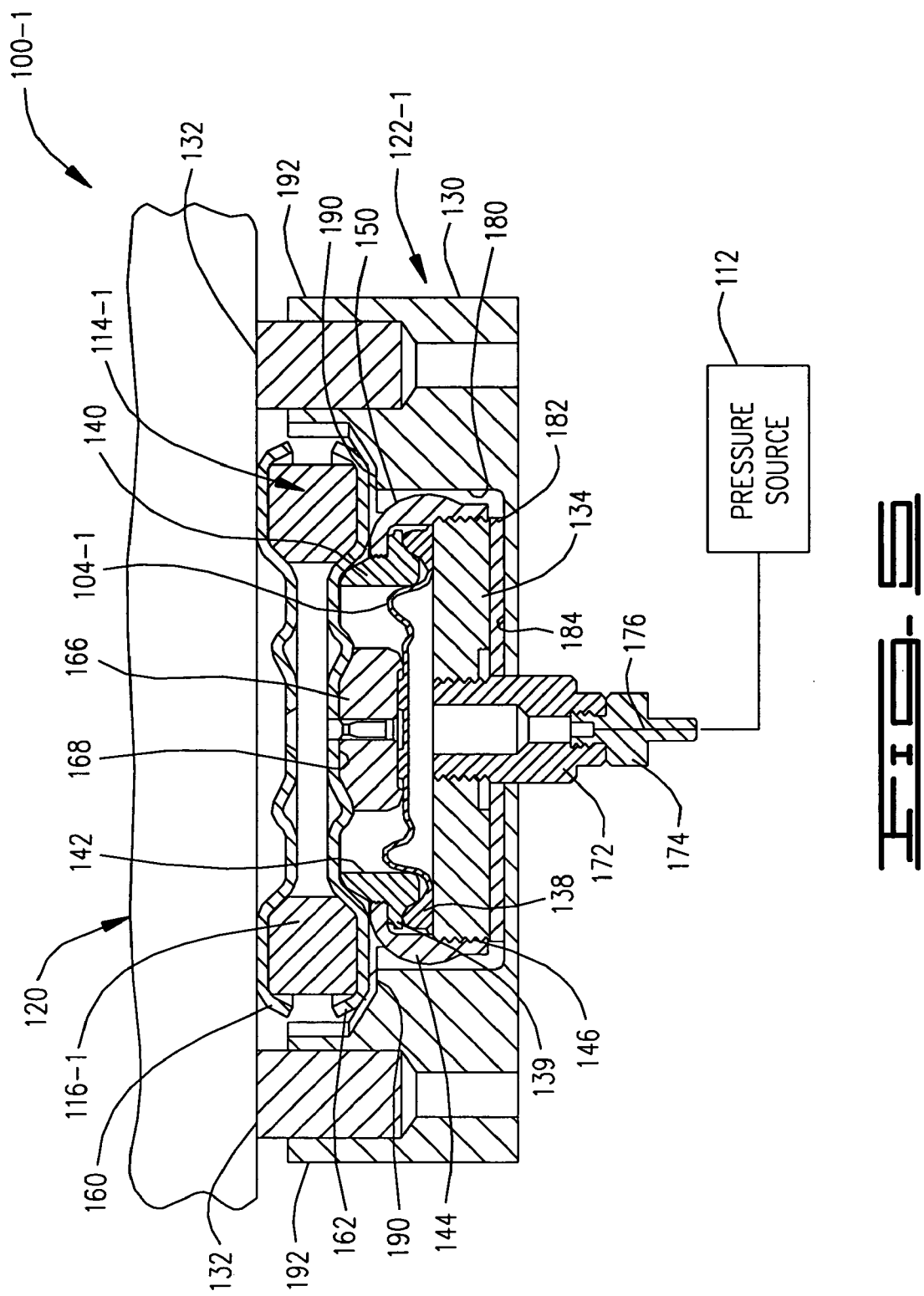
FIG. 5 is a cross-sectional view taken along line 5—5 of FIG. 2 with the diaphragm in a collapsed profile.

In the expanded mode load button 166 and floating body 114-1 are elevated or spaced from the cylindrical cavity 142 formed by the ring 140, and in the collapsed mode of the fluid isolator assembly, the load button 166 is disposed in the cylindrical cavity 142 of the ring 140 as generally shown in FIG. 5. As previously described, pressure is supplied to the fluid chamber 106-1 through a passageway which in the embodiment shown is formed by a threaded stud 172 and restrictor fitting 174 to form a restricted passageway 176 through an opening in the base plate. Restrictor fitting 174 is threaded to stud 172 extending through the opening in the base plate 134 to form a relatively restricted passageway 176 opened to the fluid chamber to form the air or fluid spring to damp vibration. The size of the passageway or orifice 176 and volume of the chamber define a spring constant for the fluid isolator or spring which can be designed for desired or lower frequency vibration control. In an alternate embodiment, fitting 174 is removed and stud 172 is screwed into an external fluid chamber (not shown) to connect the fluid chamber to a larger external fluid chamber (not shown) through passageway of stud 172 to increase an effective volume of the air spring to lower its natural frequency. Restrictor is removed to provide a less restricted passageway so that fluid passes freely to the larger chamber for example with a restricted between that chamber and an air supply.

As shown, the isolator assembly is supported in a cavity 180 of the cradle 130. In the embodiment shown, a washer 182 is interposed between a cradle floor 184 and the base plate 134 of the fluid isolator assembly. As shown in FIG. 5, for shipping or interim periods when the chamber 106-1 is not pressurized the floating body 114-1 is supported on the ring 140 and fastener 144. The load is supported by the plugs 132 on posts 192 as previously described. As described, the base plate, spacer, fasteners, rings and fittings of the apparatus can be formed from plastic or metal materials. If spacer washer 182 was removed floating body 114-1 would rest on interface surfaces 190 of cradle 130.

Figure 6:
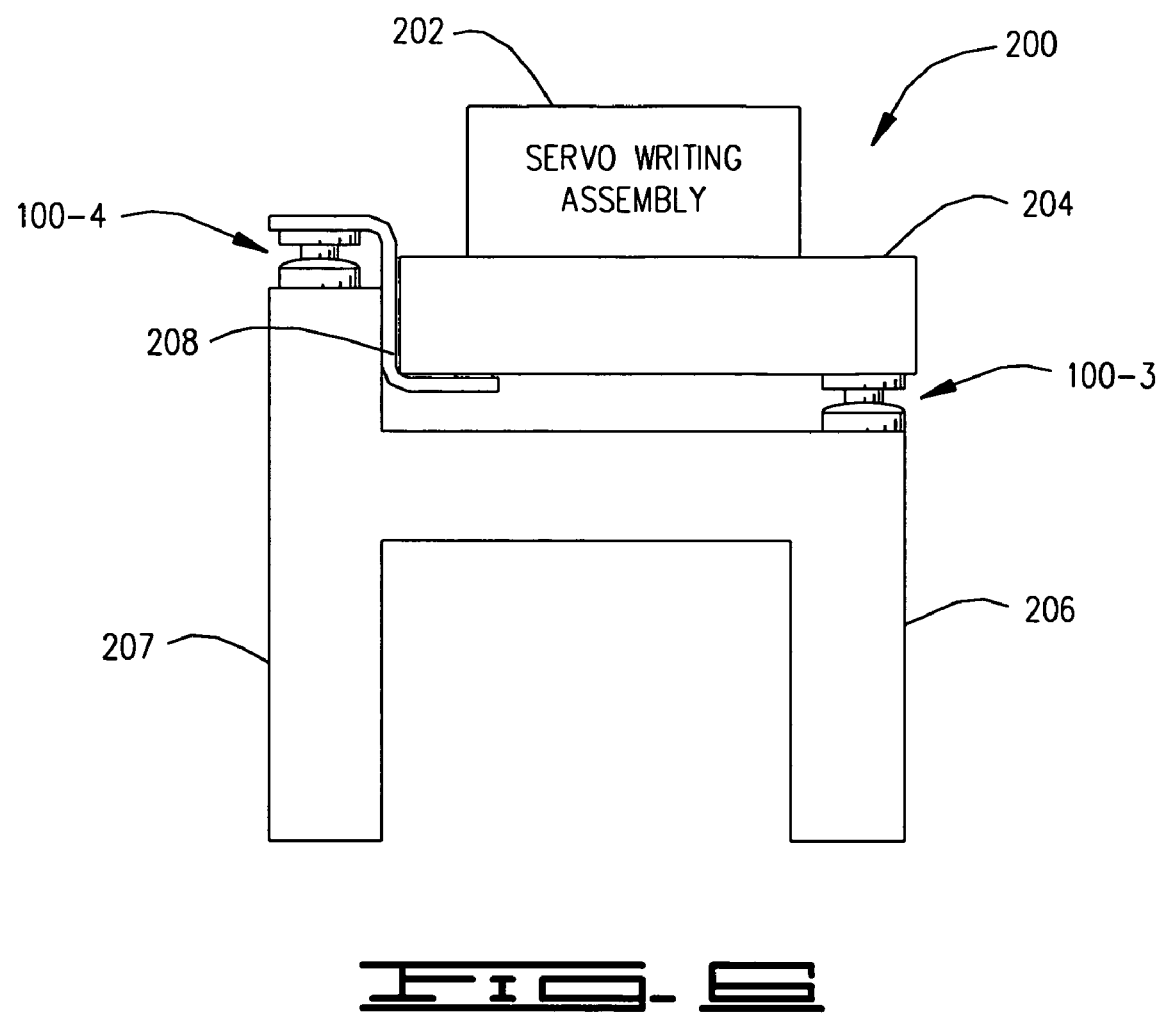
FIG. 6 schematically illustrates a servo writing apparatus including servo writing components supported on a platform dynamically isolated from a frame of the apparatus by an isolator apparatus.

Data storage devices use servo information to control head position relative to a disc or media surface for read or write operations. Recording density is increasing requiring more accurate servo control feedback which is limited by alignment of recorded servo patterns or information on the disc or discs. Servo information can be recorded on a disc or discs using a dedicated servo writing apparatus. FIG. 6 illustrates an embodiment of a servo writing apparatus 200 including a servo writing assembly 202 which is supported on a rigid platform or table 204 such as a granite slab. Vibration or movement of the apparatus or components can degrade the written servo pattern or information.

In the embodiment shown in FIG. 6, the present invention includes a plurality of isolator apparatus 100-3, 100-4 between the rigid platform or slab 204 and a frame 206 supporting the rigid platform or table 204 relative to the ground. The isolator apparatus 100-3, 100-4 include a fluid isolator assembly with an elastomeric damping element to limit vibration and isolate the platform 204 and servo components from the frame 206. Frame includes an elevated portion 207 and platform 204 (represented by load 120 in FIGS. 1–5) is coupled to a bracket 208 along one side to provide an interface between the platform 204 and the raised or elevated portion 207 of the frame 206. As shown isolator assemblies 100-3, 100-4 are positioned between the frame 206 and the platform 204 and isolator assemblies 100-4 are raised or elevated relative to isolator assemblies 100-3. In particular, isolator assemblies 100-4 are mounted high along the one side of the platform 204 between the bracket 208 (or the platform 204) and the elevated portion 207 of the frame 206, thereby placing the center of gravity of the platform 204 at the average center of support provided by the two isolator assemblies 100-3 on one side and two raised isolator assemblies on another side 100-4 as illustrated in FIG. 7 (only one isolator assembly 100-4 is visible in FIG. 7), although application is not limited to a particular arrangement or particular number of isolator assemblies.

Figure 7:
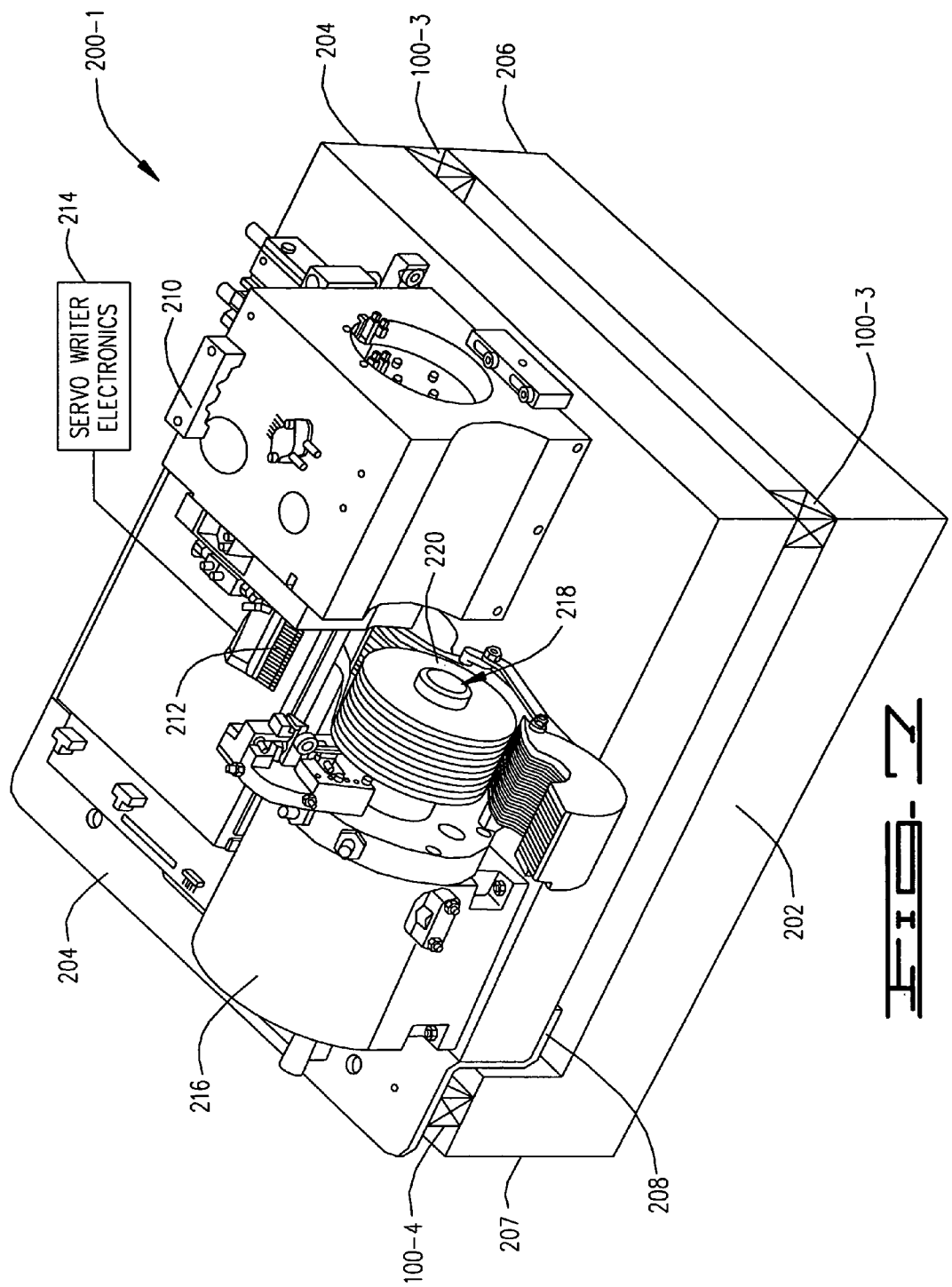
FIG. 7 schematically illustrates a servo writing apparatus including an isolating apparatus (illustrated diagrammatically) to dynamically isolate the servo writing components for vibration control.

In the embodiment shown in FIG. 7, the servo writing apparatus 200-1 includes a servo assembly including vertically orientated discs to form a vertically orientated servo assembly. The servo assembly includes a servo actuator block 210 including a plurality of servo heads 212 coupled to servo writer electronics or circuitry 214 and a spindle block 216 including a spindle hub 218 adapted to support a plurality of discs 220 in a vertical orientation. The servo heads 212 and discs 220 are merged and the discs are rotated to record servo information to the discs via the servo writer electronics 214. As shown, the assembly includes a plurality of isolator apparatus 100-3 and 100-4 interposed between the servo platform 204 and frame 206 to isolate the servo assembly and components to limit servo writing errors as previously described.

The isolator apparatus 100-3 and 100-4 include a fluid isolator assembly and viscoelastomeric damping element. In an embodiment described, the isolator apparatus include a floating body separate from the fluid isolator assembly. The floating isolator body includes the viscoelastomeric damping element in series with the fluid isolator assembly to provide a load or transmission path between the table or platform 204 and the frame 206 through a diaphragm of a fluid isolator assembly as previously described. In an illustrated embodiment, four isolator apparatus are interposed between the platform 204 and the frame 206 as shown. An embodiment of the isolator apparatus for the servo writing apparatus 200-1 includes a fluid isolator with a diaphragm and floating body having a low profile and is designed to support a 2501b payload which lowers less than 0.01 inch per additional pound at a corner to limit the need for leveling valves.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the apparatus may be inverted so that the fluid isolator is upside down, above the floating (viscoelastic) isolator body and thus the direction of the load or transmission path may be reversed relative to the fluid isolator and the floating isolator body. Particular elements of the embodiments described may vary depending on the particular application while maintaining substantially the same functionality without departing from the scope and spirit of the present invention. In addition, although the preferred embodiment described with respect to a particular application it will be appreciated by those skilled in the art that the teachings of the present invention can be applied to other applications without departing from the scope and spirit of the present invention.

What is claimed is:

1. An isolator comprising a first damping member supported by a central membrane portion of an inflatable flexible diaphragm that defines only one continuous convex surface in relation to the damping member when the diaphragm is operably inflated, the diaphragm thereby providing substantially similar spring rates in the horizontal and vertical directions when operably inflated.

2. The isolator of claim 1 wherein the damping member comprises first and second rigid plates spatially separated by an elastomeric element.

3. The isolator of claim 2 wherein the plates define receiving features mating with the elastomeric element, laterally supporting the plates with respect to each other.

4. The isolator of claim 1 wherein the flexible diaphragm comprises a non-elastic flexible fabric.

5. The isolator of claim 1 further comprising a base configured to selectively inflate the diaphragm.

6. The isolator of claim 1 further comprising a cradle defining a cavity receivingly engaging the flexible diaphragm, the cradle defining an extended load support tat is contactingly engageable with a load on the first damping member when the diaphragm is operably deflated.

7. The isolator of claim 1 wherein the convex surface is frusto-conical.

8. An isolator assembly that is adapted for damping simultaneously both high frequency and low frequency vibration by supporting a portion of a machine tool on a floating elastomeric member that is pressingly engageable against a flexible membrane portion of a continuous convex diaphragm that operably provides substantially similar horizontal and vertical spring rates.

9. The isolator assembly of claim 8 wherein the diaphragm is frusto-conical.

* * * * *